Jan. 16, 1923.
G. O. TERRY.
CLUTCH MECHANISM.
FILED SEPT. 7, 1920.
1,442,106.
2 SHEETS—SHEET 1.
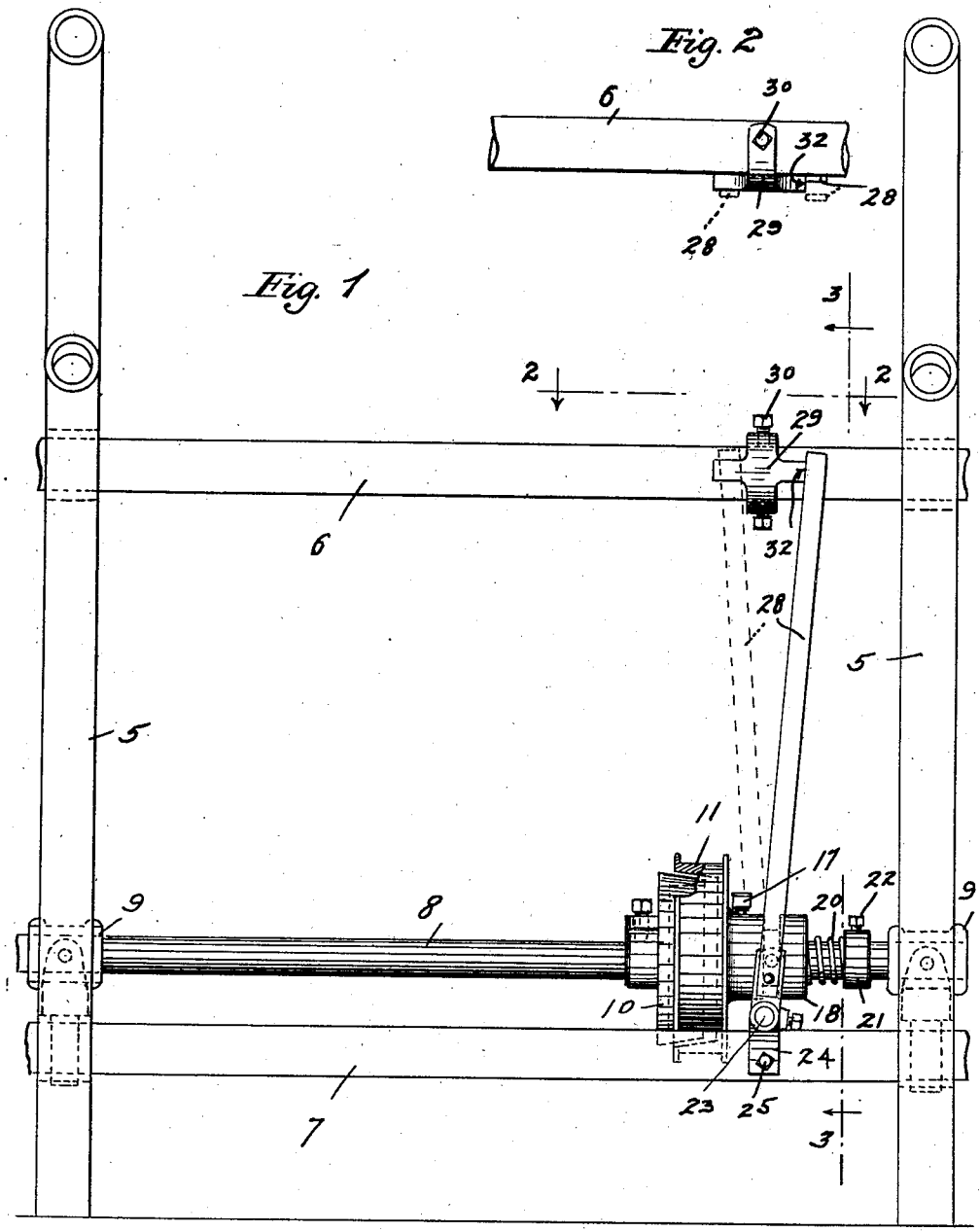
Inventor
George Orvill Terry
By his Attorney
Harry D. Kilgore

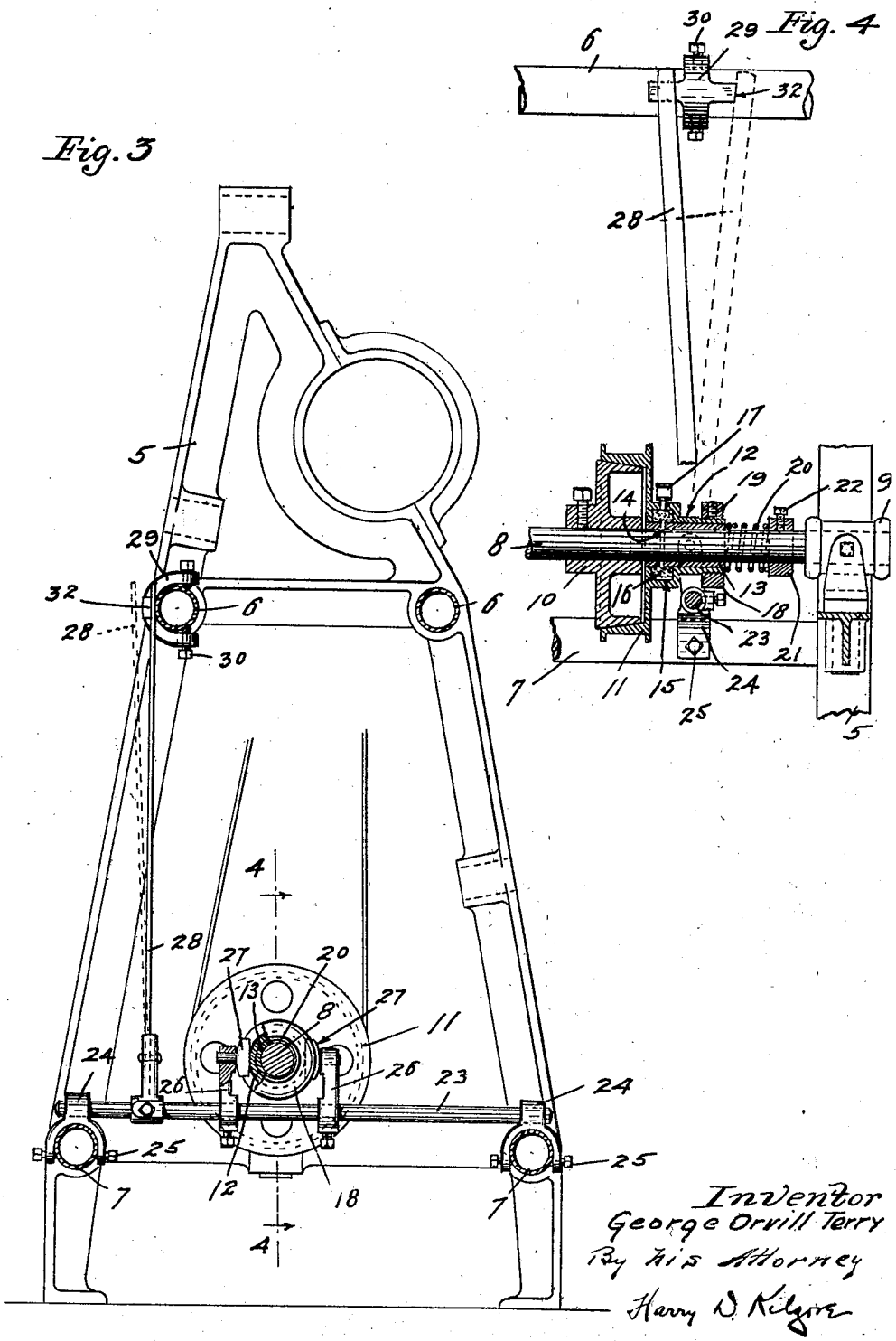

Patented Jan. 16, 1923.

1,442,106

UNITED STATES PATENT OFFICE.

GEORGE ORVILL TERRY, OF MINNEAPOLIS, MINNESOTA, ASSIGNOR TO ECONOMY SHOE MACHINERY COMPANY, OF MINNEAPOLIS, MINNESOTA, A CORPORATION OF MINNESOTA.

CLUTCH MECHANISM.

Application filed September 7, 1920. Serial No. 408,611.

*To all whom it may concern:*

Be it known that I, GEORGE ORVILL TERRY, a citizen of the United States, residing at Minneapolis, in the county of Hennepin and State of Minnesota, have invented certain new and useful Improvements in Clutch Mechanism; and I do hereby declare the following to be a full, clear, and exact description of the invention, such as will enable others skilled in the art to which it appertains to make and use the same.

My present invention relates, generally, to clutch mechanism, but is directed particularly to the provision of improved clutch-actuating mechanism for frictional cone clutches, such, for example, as used in various kinds of shoe machinery, but also used elsewhere.

Generally stated, the invention consists of the novel devices and combinations of devices hereinafter described and defined in the claim.

The invention is illustrated in the accompanying drawings, wherein like characters indicate like parts throughout the several views.

Referring to the drawings:

Fig. 1 is a view showing the framework of a machine, such, for example, as that of a shoe-finishing machine, and showing the improved clutch-actuating mechanism applied thereto in association with a cone clutch;

Fig. 2 is a plan view of certain parts found in the vicinity of the line marked 2—2 on Fig. 1;

Fig. 3 is a vertical section taken approximately on the line 3—3 of Fig. 1, some parts being broken away; and Fig. 4 is a fragmentary view looking from the left toward the right in respect to Fig. 3, showing certain parts in elevation and other parts in vertical section on the line 4—4 of Fig. 3.

The framework of the machine illustrated is made up of end brackets 5 and cross ties 6 and 7, said elements 6 and 7, as shown, being steel or iron tubes. The numeral 8 indicates a countershaft journaled in suitable bearings 9 on the end brackets 5. This shaft 8 may be assumed to be driven in the usual way or by any suitable means, not shown, and rigidly secured thereon is an externally conical clutch cone 10. The numeral 11 indicates an internally conical combined clutch cone and pulley. This combined clutch cone and pulley 11 is provided with an axially projected sleeve-like hub 12, the interior of which is larger than the exterior of the shaft 8, so that a bushing 13 is interposed between said sleeve and shaft. This bushing 13 may be made in two sections or may be perforated so that it is provided with a radial oil passage or passages 14 located centrally of an annular internal groove 15 formed within an enlarged portion of the hub 12 and containing felt or other porous oil-absorbing packing 16. As shown, an oil cup 17, applied to the enlarged portion of the hub 12, delivers oil to the felt packing 16.

The end of the sleeve-like hub 12 is externally threaded, and mounted thereon, with threaded engagement, is an adjustable collar 18 adapted to be locked thereon by a set screw 19. The numeral 20 indicates a coiled spring compressed between the outer end of the hub 12 and a thrust collar 21 that is adjustably secured on the shaft 8 by a set screw 22.

The numeral 23 indicates a rock shaft mounted in bearings 24 secured to the lower cross tubes 7. As shown, these bearings 24 are forked so that they embrace said tubes and are provided with set screws 25 for rigidly but detachably securing the same to said tubes.

On each side of the hub 12, the rock shaft 23 is provided with shipper arms 26 equipped with pivoted shoes 27 that work in the channel formed between the collar 18 and the enlarged portion of the hub 12.

The numeral 28 indicates an operating lever secured to the shaft 23 and extended upward for co-operation with a lock plate or bracket 29, shown as secured on one of the upper cross tubes 6. This so-called lock plate 29, as shown, is a forked structure, provided with set screws 30, by means of which it is rigidly but detachably and adjustably secured on one of the tubes 6. This lock plate 29 is provided with a flat outer wearing face, and, at one extremity, with an offset portion affording a lock shoulder 32 (see particularly Fig. 2).

The lever 28 yieldingly bears against the wearing face of the lock plate 29 and is under such normal tension that, when moved to the position shown by full lines in Fig. 1 and by dotted lines in Fig. 2, it will spring laterally into engagement with the tube 6 to which said lock plate is secured and back of the shoulder 32 and lock said lever against movement toward the left. When said lever is located in the extreme position toward the right, the movable clutch element 11 will be disengaged from the rotating clutch element 10 and the spring 20 will be held under compression by exerting a force tending to throw said lever to the left and to engage the clutch elements. Otherwise stated, the clutch is then locked open or inoperative.

When it is desired to throw the clutch elements into engagement, it is only necessary to spring the upper end of the lever 28 laterally outward, so as to release the same from the shoulder 32 and thereupon the spring 20 will instantly come into action and throw said lever to the left to the position shown by dotted lines in Fig. 1 and full lines in Fig. 4. When this action takes place, the combined clutch and pulley 11 will be driven with the shaft 8.

It will be observed that the flat wearing face of the lock plate 29 is so extended that, when the lever 28 is in its extreme position toward the left, the upper end of said lever 28 will always be free for return movement toward the right or toward its locked position in engagement with the shoulder 32.

It may now be noted that the wear which will take place between the shoes 27, the enlarged shoulder portion of the hub 12 and the collar 18, may be taken up from time to time by adjustments of said collar 18. It will also be noted that the tension of the spring 20 may be varied by adjustments of the collar 21 on the shaft 8.

What I claim is:

The combination with a frame member, of cooperating clutch members and yielding means tending to engage the same, a lever connected to the movable clutch member for shifting the same, the free end of said lever being arranged to engage the frame member by a lateral springing movement, a lock plate having a fork, the prongs of which embrace the frame member with freedom for longitudinal adjustment thereon, and means for adjustably securing the lock plate to the frame member in different set adjustments, said lever being arranged to engage one end of the lock plate as a stop when bearing against the frame member and moved against the tension of said yielding means to release the clutch members, said lever also being arranged to engage the lock plate with freedom for sliding movement thereon under the action of said yielding means when sprung laterally out of engagement with said end of the lock plate.

In testimony whereof I affix my signature.

GEORGE ORVILL TERRY.